(12) United States Patent
Lee et al.

(10) Patent No.: US 12,609,410 B2
(45) Date of Patent: Apr. 21, 2026

(54) HIGH HEAT-RESISTANT CONNECTOR, AND BATTERY MODULE, BATTERY PACK, AND VEHICLE INCLUDING THE SAME

(71) Applicant: LG ENERGY SOLUTION, LTD., Seoul (KR)

(72) Inventors: Chang-Hun Lee, Daejeon (KR); Sang-Eun Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 521 days.

(21) Appl. No.: 18/029,016

(22) PCT Filed: Sep. 19, 2022

(86) PCT No.: PCT/KR2022/013945
§ 371 (c)(1),
(2) Date: Mar. 28, 2023

(87) PCT Pub. No.: WO2023/048443
PCT Pub. Date: Mar. 30, 2023

(65) Prior Publication Data
US 2024/0363964 A1 Oct. 31, 2024

(30) Foreign Application Priority Data

Sep. 23, 2021 (KR) ........................ 10-2021-0125999

(51) Int. Cl.
*H01M 50/383* (2021.01)
*H01M 50/211* (2021.01)
(Continued)

(52) U.S. Cl.
CPC ....... *H01M 50/383* (2021.01); *H01M 50/211* (2021.01); *H01M 50/224* (2021.01);
(Continued)

(58) Field of Classification Search
CPC .......................... H01M 50/296; H01M 50/383
See application file for complete search history.

(56) References Cited

U.S. PATENT DOCUMENTS

2010/0178536 A1 7/2010 Kwak et al.
2011/0133548 A1 6/2011 Toyama et al.
(Continued)

FOREIGN PATENT DOCUMENTS

EP 2 056 412 B1 5/2016
JP 2000067826 A * 3/2000
(Continued)

OTHER PUBLICATIONS

Machine Translation of WO-2021107517-A1 (Year: 2021).*
(Continued)

*Primary Examiner* — Gregg Cantelmo
(74) *Attorney, Agent, or Firm* — Birch, Stewart, Kolasch & Birch, LLP

(57) ABSTRACT

A battery module includes a cell assembly including at least one battery cell, a module case in which the cell assembly is accommodated, and a connector mounted on the module case. The connector includes a connector terminal for electrical connection with the battery cell, a connector housing surrounding the connector terminal, and a connector header body coupled to the connector housing and mounted on the module case in such a manner that at least a part of the connector header body is inserted into the module case. The connector header body is formed of a heterogeneous laminate material including a heat-resistant metal material with a melting point of 1000° C. or higher and a lightweight metal material lighter than the heat-resistant metal material.

20 Claims, 11 Drawing Sheets

(51) Int. Cl.

| | |
|---|---|
| *H01M 50/224* | (2021.01) |
| *H01M 50/24* | (2021.01) |
| *H01M 50/249* | (2021.01) |
| *H01M 50/262* | (2021.01) |
| *H01M 50/296* | (2021.01) |

(52) U.S. Cl.

CPC ......... *H01M 50/24* (2021.01); *H01M 50/249* (2021.01); *H01M 50/262* (2021.01); *H01M 50/296* (2021.01); *H01M 2220/20* (2013.01); *H01R 2201/26* (2013.01)

(56) References Cited

U.S. PATENT DOCUMENTS

| | | | |
|---|---|---|---|
| 2012/0244398 A1 | 9/2012 | Youngs et al. | |
| 2015/0364799 A1 | 12/2015 | Miller et al. | |
| 2016/0141584 A1 | 5/2016 | Eichorn | |
| 2017/0025663 A1* | 1/2017 | Kim | H01R 13/5202 |
| 2019/0355959 A1 | 11/2019 | Ro | |
| 2020/0335737 A1 | 10/2020 | Hilligoss et al. | |
| 2021/0091380 A1* | 3/2021 | Atala | H01M 50/172 |
| 2021/0265551 A1 | 8/2021 | Lee et al. | |

| | | |
|---|---|---|
| 2021/0336272 A1 | 10/2021 | Oh et al. |
| 2022/0376323 A1 | 11/2022 | Lee et al. |

FOREIGN PATENT DOCUMENTS

| | | | | |
|---|---|---|---|---|
| JP | 2009-110754 A | 5/2009 | | |
| JP | 6074890 B2 | 2/2017 | | |
| JP | 2020-506506 A | 2/2020 | | |
| JP | 6853099 B2 | 3/2021 | | |
| KR | 10-2010-0082532 A | 7/2010 | | |
| KR | 10-2016-0041311 A | 4/2016 | | |
| KR | 10-1668787 B1 | 10/2016 | | |
| KR | 10-1939018 B1 | 1/2019 | | |
| KR | 10-2019-0046688 A | 5/2019 | | |
| KR | 10-2067267 B1 | 1/2020 | | |
| KR | 10-2020-0084450 A | 7/2020 | | |
| KR | 10-2021-0088170 A | 7/2021 | | |
| WO | WO-2021107517 A1 * | 6/2021 | .......... | H01M 50/296 |

OTHER PUBLICATIONS

Machine Translation of JP-2000067826-A (Year: 2000).*
Extended European Search Report for European Application No. 22873148.5, dated Oct. 25, 2024.

* cited by examiner

HIGH HEAT-RESISTANT CONNECTOR, AND BATTERY MODULE, BATTERY PACK, AND VEHICLE INCLUDING THE SAME

TECHNICAL FIELD

The present disclosure relates to a battery module, a battery pack, and a vehicle including the same, and more particularly, to a battery module including an improved connector, a battery pack, and a vehicle including the same. The present application claims priority to Korean Patent Application No. 10-2021-0125999 filed on Sep. 23, 2021 in the Republic of Korea, the disclosures of which are incorporated herein by reference.

BACKGROUND ART

Because secondary batteries have high applicability according to product groups and electrical characteristics such as high energy density, the secondary batteries are commonly applied not only to mobile devices but also to electric vehicles or hybrid vehicles driven by electric power sources, energy storage systems, etc. Because secondary batteries may radically reduce the use of fossil fuel and do not generate any by-products that come with energy consumption, the secondary batteries are gaining attention as a new alternative energy source for improving eco-friendliness and energy efficiency.

A battery pack applied to an electric vehicle or the like has a structure in which a plurality of cell assemblies including a plurality of secondary battery cells are connected in series to obtain high power. A battery cell includes positive and negative current collectors, a separator, an active material, and an electrolytic solution, and may be repeatedly charged and discharged through an electrochemical reaction between elements.

As the need for a large-capacity structure including the use as an energy storage source has recently increased, the demand for a battery pack having a multi-module structure in which a plurality of battery cells are connected in series and/or in parallel has increased. When a battery pack is configured, a method of first configuring a battery module including at least one battery cell and adding other elements by using the at least one battery module to configure a battery pack is general. The number of battery modules included in the battery pack, or the number of battery cells included in the battery module may be set in various ways according to a required output voltage or charge/discharge capacity.

A battery module packages battery cells and various electronic components in a module case, and includes a connector for electrical connection with external devices outside the module case. The connector may be a connection connector for electrically connecting a plurality of battery modules, a sensing connector for monitoring a voltage of battery cells, a charging connector for connecting to a charging device for charging battery cells, or an output connector for connecting to a motor that is driven by using energy charged in battery cells.

Because a conventional battery module is manufactured such that a plurality of battery cells are densely packed in a narrow space, it is important to prevent fire or the like. In particular, when such a battery module and a battery pack including the same are applied to a vehicle, it is necessary to pass a strict safety test.

In a connector provided in an existing battery module, most portions other than a connector terminal are manufactured through general plastic injection. When an abnormally high temperature occurs in a battery module using such a connector, the connector easily melts. In particular, a battery module equipped with such a connector or a battery pack that is a set of battery modules may not pass a thermal runaway test. A thermal runaway test refers to a test in which a battery pack or system provides a thermal event alarm signal 5 minutes before thermal diffusion due to thermal runaway of a battery, which in turn causes a danger in the passenger compartment of a vehicle, according to GB standards.

Accordingly, in order to satisfy the GB standards, a connector for preventing the spread of a high-temperature environment caused by a flame or the like and/or a high-pressure environment caused by venting gas is absolutely required.

DISCLOSURE

Technical Problem

The present disclosure is designed in consideration of the above problems, and therefore the present disclosure is directed to providing an improved connector in which a high-temperature environment caused by a flame or the like in a battery module and/or a high-pressure environment caused by venting gas in the battery module is prevented from spreading to the outside.

The present disclosure is also directed to providing a battery module including the improved connector.

The present disclosure is also directed to providing a battery pack and a vehicle including the battery module to increase safety against fire or explosion.

However, the technical purpose to be solved by the present disclosure are not limited to the above, and other objects not mentioned herein will be clearly understood by one of ordinary skill in the art from the following disclosure.

Technical Solution

In an aspect of the present disclosure, there is provided a connector including a connector terminal, a connector housing surrounding the connector terminal, and a connector header body coupled to the connector housing and formed of a heterogeneous laminate material including a heat-resistant metal material with a melting point of 1000° C. or higher and a lightweight metal material lighter than the heat-resistant metal material.

The connector header body may include a first portion formed of the heat-resistant metal material and a second portion that is closer to the connector housing than the first portion and is formed of the lightweight metal material.

The connector header body may include a first portion that is relatively farther from the connector housing and is formed of stainless steel (SUS metal) and a second portion that is closer to the connector housing than the first portion and is formed of an aluminum-based metal material.

The heterogeneous laminate material may be a clad metal.

In another aspect of the present disclosure, there is provided a battery module including a cell assembly including at least one battery cell, a module case in which the cell assembly is accommodated, and a connector mounted on the module case. The connector includes a connector terminal for electrical connection to the battery cell, a connector housing surrounding the connector terminal, and a connector header body coupled to the connector housing and mounted on the module case in such a manner that at least a part of the connector header body is inserted into the module case. The connector header body is formed of a heterogeneous laminate material including a heat-resistant metal material with a melting point of 1000° C. or higher and a lightweight metal material lighter than the heat-resistant metal material.

The connector header body may include a first portion that faces the cell assembly inside the module case and is formed of the heat-resistant metal material and a second portion that faces an outside of the module case compared to the first portion and is formed of the lightweight metal material.

The connector header body may include a first portion that faces the cell assembly inside the module case and is formed of stainless steel (SUS metal) and a second portion that faces an outside of the module case compared to the first portion and is formed of an aluminum-based metal material.

In the connector header body, the heat-resistant metal material may face the cell assembly inside the module case and a melting point of the heat-resistant metal material may be 1400° C. or higher.

An opening may be formed in the module case, and the connector header body may be in surface contact with the module case inside the opening and a bolt may be fastened in the connector body to keep the opening airtight.

The connector header body may include a first portion that faces the cell assembly inside the module case and is formed of the heat-resistant metal material and a second portion that faces an outside of the module case compared to the first portion and is formed of the lightweight metal material.

The connector housing may be coupled to the connector header body by press-fitting or hook-type fastening.

The connector housing and the connector header body may be a single integrally formed product.

The connector housing and the connector header body may be a single, integrally formed product.

The battery module may further include a sealing gasket located between the module case and the connector header body, the sealing gasket having a melting point of 1000° C. or higher.

An opening may be formed in the module case, and the connector header body may be in contact with the module case via the sealing gasket inside the opening to keep the opening airtight.

The sealing gasket may have a frame shape with a central opening having a same size as a size of the opening.

The sealing gasket and the connector header body may be fastened to the module case with a bolt.

The sealing gasket may be a silicone gasket.

In another aspect of the present disclosure, there are provided a battery pack including at least one battery module and a vehicle including at least one battery pack.

Advantageous Effects

According to the present disclosure, an improved connector, that is, a high heat-resistant connector, in which a high-temperature environment caused by a flame in a battery module and/or a high-pressure environment caused by venting gas in the battery module is prevented from spreading to the outside and a battery module including the connector are provided.

Because the battery module according to the present disclosure includes a connector including a connector header body formed of a heat-resistant metal material with a melting point of 1000° C. or higher, even when a flame occurs in the battery module and thus an abnormally high temperature state is caused, the flame may be prevented from spreading to the outside of the battery module. Also, even when venting gas is generated in the battery module and thus an abnormally high pressure state is caused, explosion through the connector may be prevented.

In particular, as proposed in the present disclosure, when a heterogeneous composite material is applied to the connector so that only a portion exposed to the flame inside the battery module is formed of a heat-resistant metal material and the remaining portion is formed of a lightweight metal material lighter than the heat-resistant metal material, airtightness, heat resistance, and weight reduction may be achieved.

As such, according to the present disclosure, there is provided the batter module including a high heat-resistant connector in which, even when thermal runaway occurs, an airtight structure of the battery module is maintained and a high temperature/high-pressure environment is tolerated. As a result of applying the heterogeneous composite material, a weight and costs may be reduced compared to a case of applying a single metal connector.

Also, because the battery module according to the present disclosure includes a sealing gasket with a melting point of 1000° C. or higher, the effect of preventing flame diffusion to the outside of the battery module may be maximized.

For example, even when a temperature adjacent to a module case rises to about 600° C. (at least 5 minutes), because the battery module including the connector as proposed in the present disclosure may withstand high temperature/high pressure (100 kpa), heat transfer may be prevented. Accordingly, according to the present disclosure, the battery module having improved safety, and a battery pack and a vehicle including the battery module may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure. In addition, in order to help the understanding of the present disclosure, the accompanying drawings are not drawn to scale, but dimensions of some components may be exaggerated.

Figure 1:
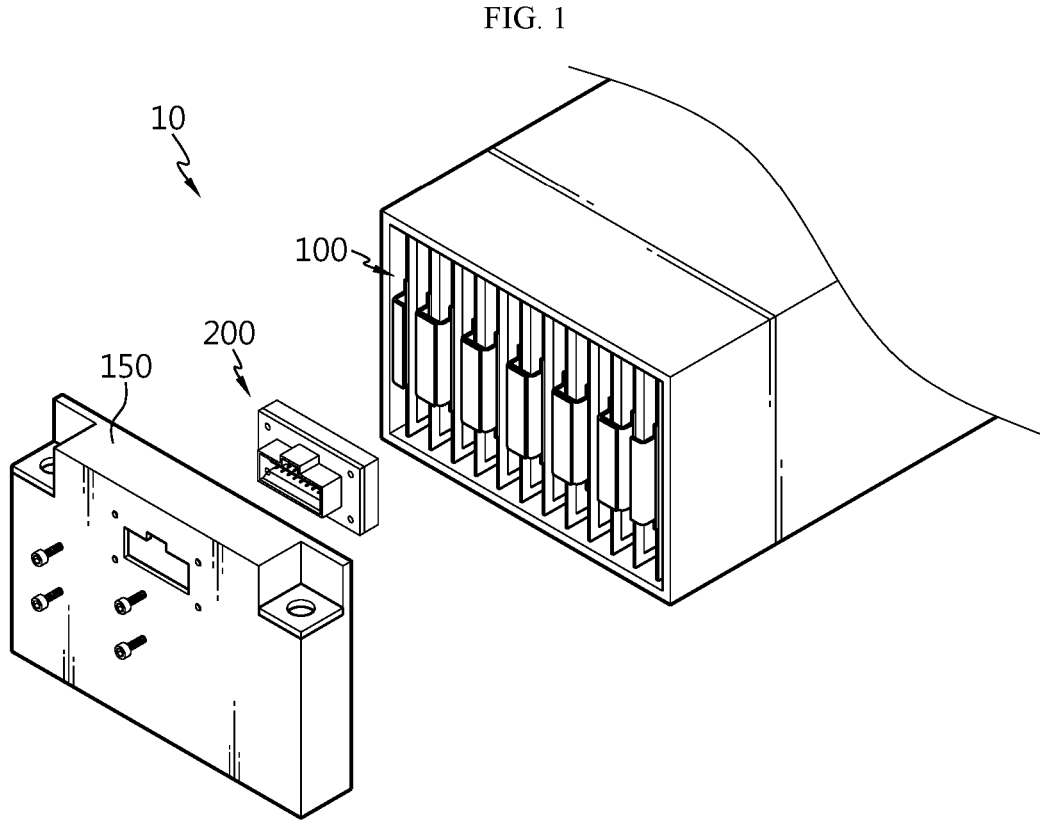
FIG. 1 is a schematic exploded perspective view illustrating a battery module, according to an embodiment of the present disclosure.
Figure 2:
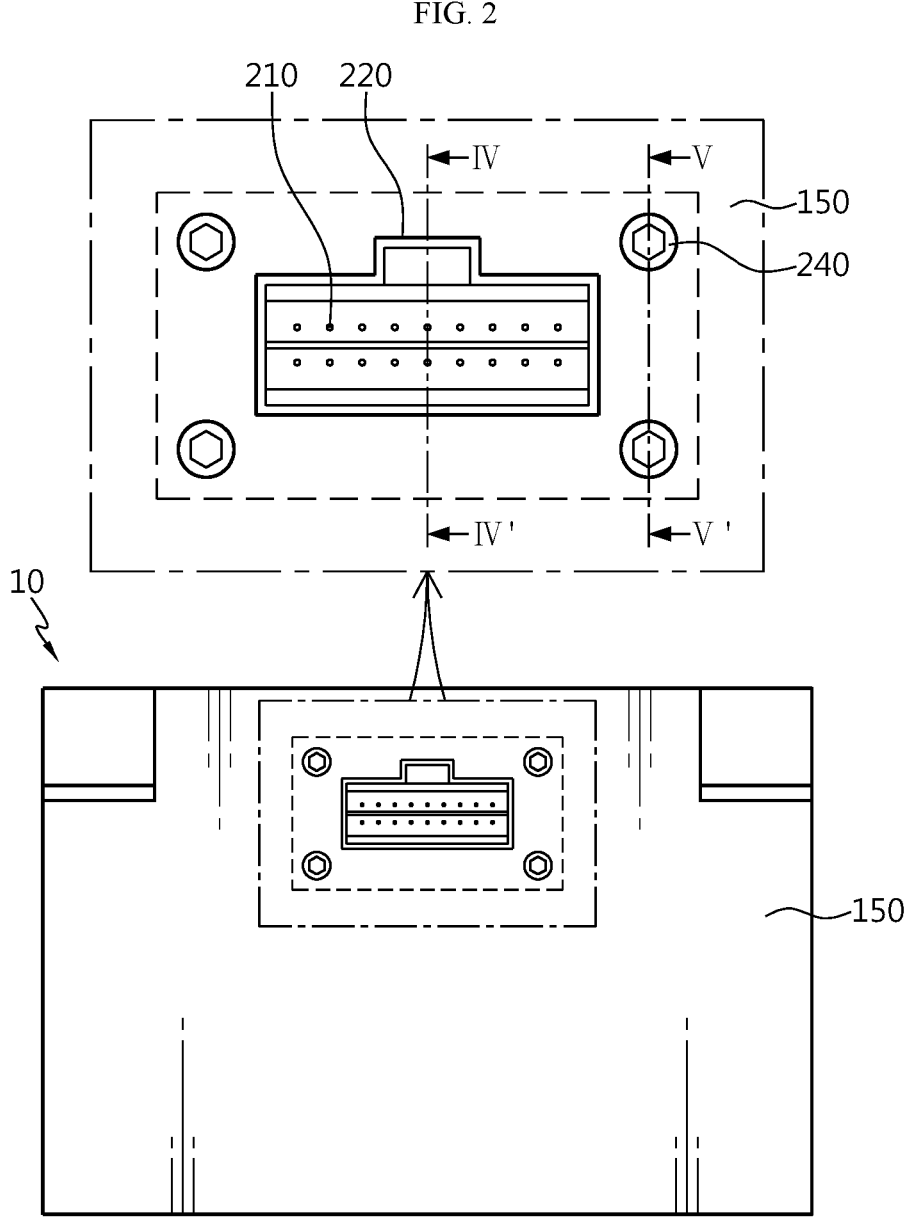
FIG. 2 illustrates a front view of a battery module and an enlarged view of a connector portion, according to an embodiment of the present disclosure.
Figure 3:
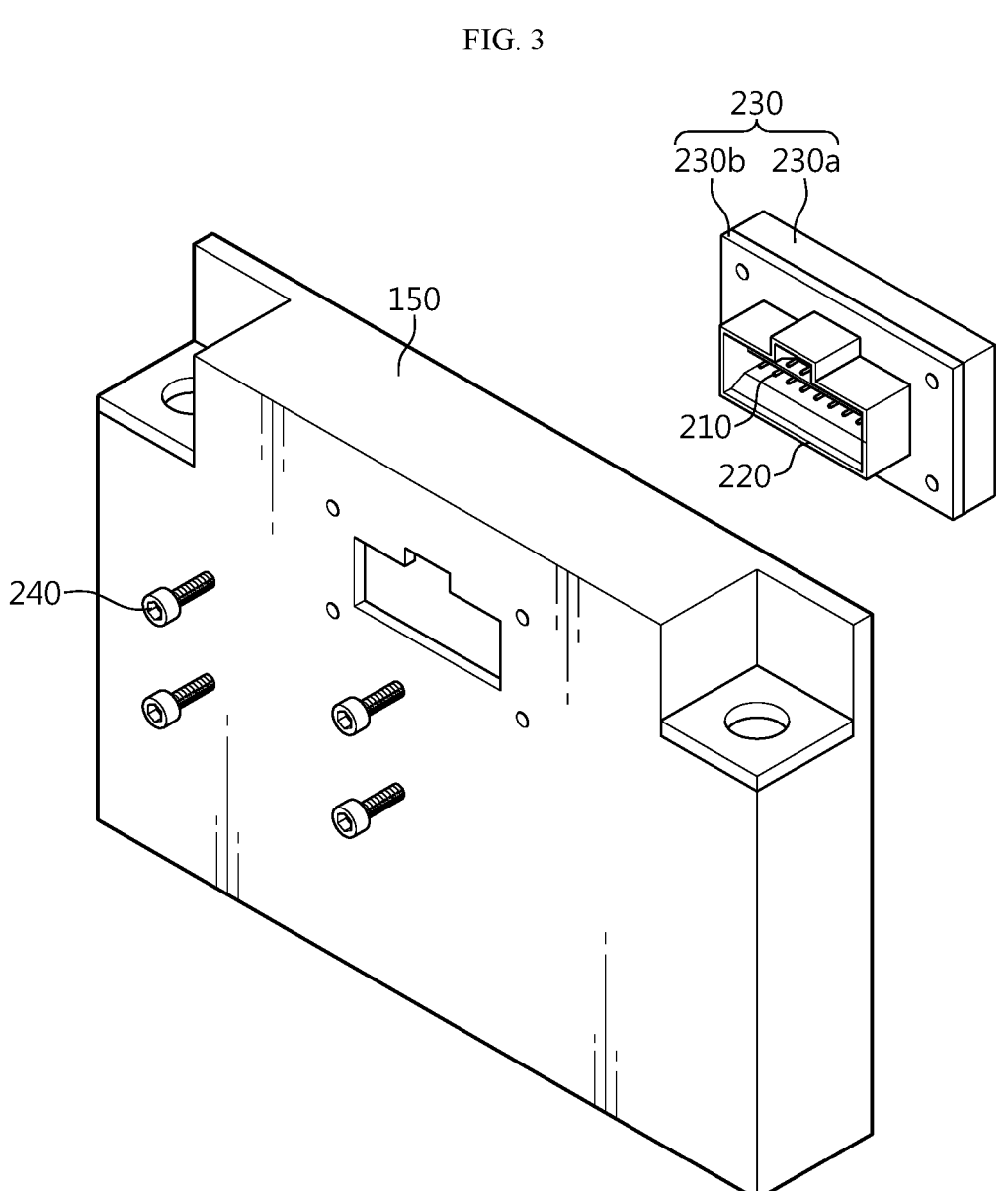
FIG. 3 is a perspective view illustrating a connector portion separated from a battery module, according to an embodiment of the present disclosure.
Figure 4:
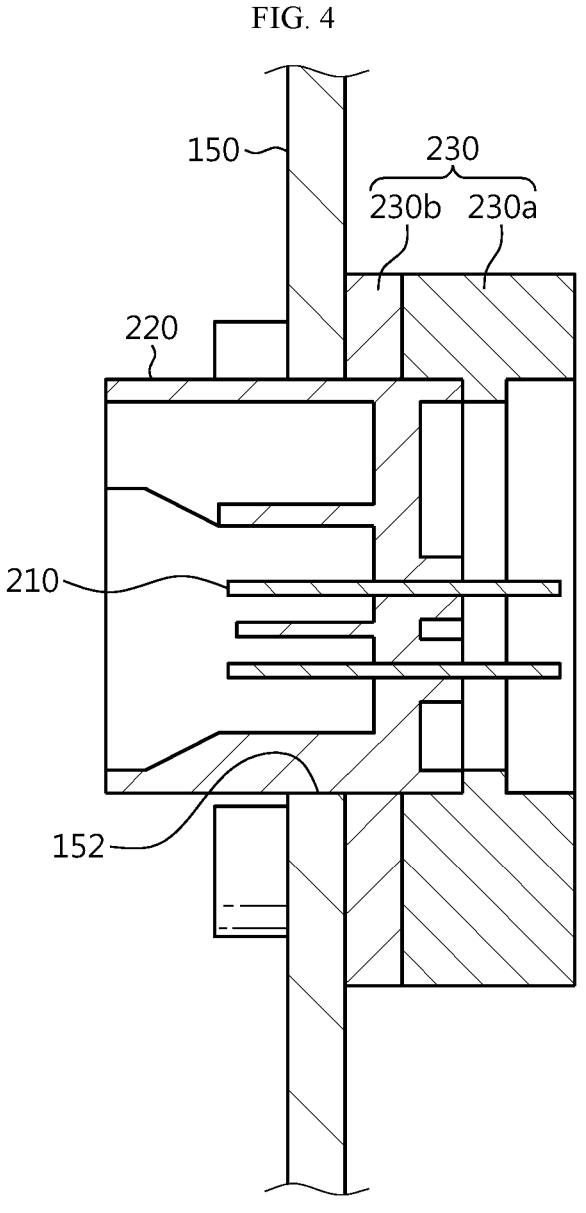
FIG. 4 is a partial cross-sectional view of FIG. 1, taken along line IV-IV' of FIG. 2.
Figure 5:
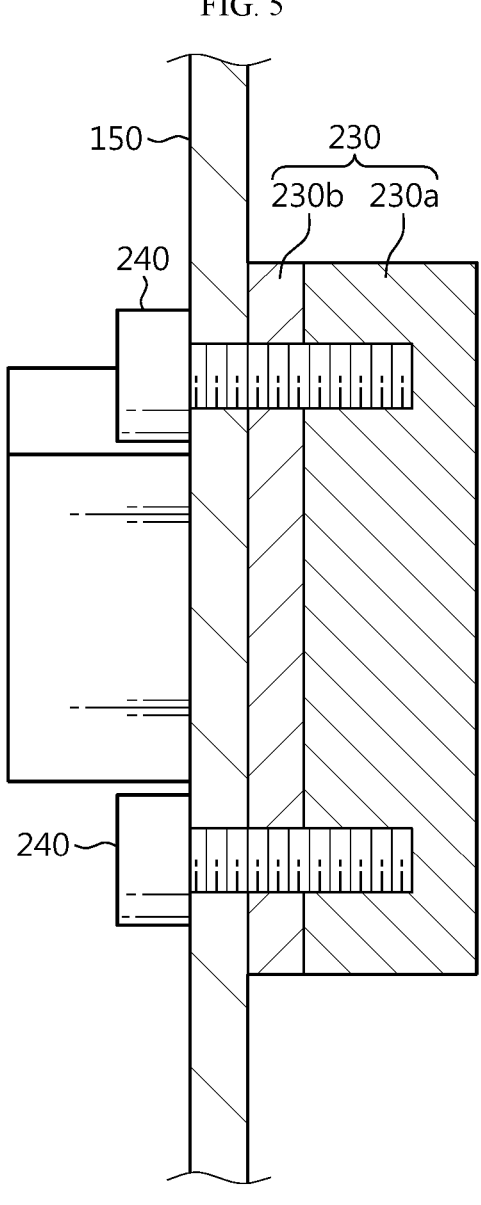
FIG. 5 is a partial cross-sectional view of FIG. 1, taken along line V-V' of FIG. 2.

FIG. 1 is a schematic exploded perspective view illustrating a battery module, according to an embodiment of the present disclosure. FIG. 2 illustrates a front view of a battery module and an enlarged view of a connector portion, according to an embodiment of the present disclosure. FIG. 3 is a perspective view illustrating a connector portion separated from a battery module, according to an embodiment of the present disclosure. FIG. 4 is a partial cross-sectional view of FIG. 1, taken along line IV-IV' of FIG. 2. FIG. 5 is a partial cross-sectional view of FIG. 1, taken along line V-V' of FIG. 2.

First, referring to FIG. 1, a battery module 10 according to an embodiment of the present disclosure includes a cell assembly 100, a module case 150, and a connector 200.

The cell assembly 100 includes at least one battery cell. The at least one battery cell of the cell assembly 100 may be a pouch-type secondary battery, and a plurality of battery cells may be stacked and arranged in the cell assembly 100. The plurality of battery cells may be electrically connected to each other, and each of the battery cells may include an electrode assembly, a casing in which the electrode assembly is accommodated, and electrode leads protruding outward from the casing and electrically connected to the electrode assembly.

The electrode leads may include a positive electrode lead and a negative electrode lead. The positive electrode lead and the negative electrode lead may be located in opposite directions in a longitudinal direction of the battery cell, or the positive electrode lead and the negative electrode lead may be located in the same direction in the longitudinal direction of the battery cell. The positive electrode lead and the negative electrode lead may be formed of various materials. For example, the positive electrode lead may be formed of an aluminum material and the negative electrode lead may be formed of a copper material.

The electrode leads may be electrically connected by a bus bar (not shown). The battery cell may have a structure in which a plurality of unit cells arranged in the order of a positive electrode plate-separator-negative electrode plate, or bicells arranged in the order of a positive electrode plate-separator-negative electrode plate-separator-positive electrode plate-separator-negative electrode plate are stacked according to capacity.

The cell assembly 100 may be configured so that a plurality of battery cells are stacked on each other. The battery cell may have any of various structures, and also, the plurality of battery cells may be stacked in any of various ways.

The cell assembly 100 may include a plurality of cartridges (not shown) in which the battery cells are accommodated. Each cartridge (not shown) may be manufactured by using plastic injection molding, and a plurality of cartridges including receiving portions in which the battery cells may be accommodated may be stacked. A terminal element may be provided in a cartridge assembly in which the plurality of cartridges are stacked. The terminal element that is a main element connected to a battery cell includes a positive electrode terminal and a negative electrode terminal, and the terminal element may be provided with a terminal bolt to be electrically connected to the outside. The battery cell may have any of various shapes.

The module case 150 has an empty inner space. The module case 150 accommodates the cell assembly 100 and forms the exterior of the battery module 10. The module case 150 may have a shape corresponding to a shape of the cell assembly 100 or the cartridge assembly. For example, when the cell assembly 100 or the cartridge assembly has a hexahedral shape, the module case 150 may also have a hexahedral shape corresponding to the cell assembly 100 or the cartridge assembly. Various electronic components may be included in the module case 150, and may include, for example, an internal circuit board (IC) or a battery management system (BMS). The electronic components such as the ICB and the BMS may be electrically connected to the plurality of battery cells.

The module case 150 may be manufactured by bending a plate formed of a metal material, or may be manufactured by a plastic injection product. The module case 150 may be manufactured integrally or as a separate type. In general, the module case 150 may be provided with at least one surface open, so that the cell assembly 100 is inserted through an open portion and then the open portion is closed. The module case 150 may be provided as a substantially rectangular parallelepiped shape.

The module case 150 may have any of various configurations. For example, the module case 150 may include a U-shaped frame that accommodates the cell assembly 100 and has an open top, and a top plate located on the U-shaped frame to cover the cell assembly 100. A top surface, a front surface, and a rear surface of the U-shaped frame are open, and thus, an end plate may be located on each of the front surface and the rear surface of the U-shaped frame to block the open front surface and rear surface.

In another example, the module case 150 may include a rectangular tube mono-frame in which both facing sides are open, and a front cover and a rear cover covering the both facing sides of the mono-frame. The present disclosure is not limited to a specific structure of the module case 150.

The connector 200 is mounted on the module case 150. The connector 200 may be mounted on a portion that is easily electrically connected to the cell assembly 100 accommodated in the module case 150. For example, the connector 200 may be mounted on a portion close to an electrode lead of a battery cell included in the cell assembly 100. For example, as shown, the connector may be mounted on the end plate, the front cover, or the rear cover adjacent to a portion where an electrode lead of a battery cell may be located in the module case 150. The connector 200 may be provided as any of various types of electrical connection components or connection members for connection to the BMS that may provide data about a voltage or a temperature of the battery cells in the battery module 10. The connector 200 is coupled to the module case 150 to transmit the data about the voltage or the temperature to the outside.

Referring to FIGS. 2 and 3, the connector 200 includes a connector terminal 210, a connector housing 2320, and a connector header body 230.

The connector terminal 210 is used to electrically connect an element provided on a side of the connector 200 to another element provided on the other side of the connector 200. In the present embodiment, the connector 200 is a sensing connector for monitoring a voltage of battery cells, and the connector terminal 210 is used for electrical connection to the battery cells of the cell assembly 100. A transmission plug (not shown) for connecting data about a voltage of the battery cells of the cell assembly 100 to the BMS may be connected to the connector terminal 210. The connector terminal 210 may include a conductive material such as copper (Cu).

The connector housing 220 surrounds the connector terminal 210. The connector housing 220 may accommodate the connector terminal 210 and may expose one end.

The connector housing 220 is coupled to the connector header body 230. The connector housing 220 may be a component, separate from the connector header body 230, manufactured through plastic injection molding. The connector housing 220 may be coupled to the connector header body 230 by press-fitting or hook-type fastening.

The connector header body 230 may expose the end of the connector terminal 210 exposed from the connector housing 220. The connector header body 230 may be mounted on the module case 150 in such a manner that at least a part of the connector header body 230 is inserted into the module case 150, and the connector housing 220 is maintained outside the module case 150. The connector terminal 210 may pass through the connector housing 220 and the connector header body 230. A hole may be formed in the connector header body 230 so that the connector terminal 210 passes through the hole. The connector terminal 210 may be inserted into the module case 150 through the hole of the connector header body 230.

The connector header body 230 is coupled to the module case 150. The connector header body 230 may be coupled to the module case 150 by using any of various methods.

Referring to FIGS. 4 and 5, an opening 152 is formed in the module case 150, and the connector header body 230 is in surface contact with the module case 150 inside the opening 152 and a bolt 240 is fastened to keep the opening 152 airtight. A fastening hole through which the bolt 240 passes may be formed in the connector header body 230.

All portions of the module case 150 other than the opening 152 may be sealed by using a welding process. In this case, when thermal runaway occurs in the battery module 10, a portion where a flame and gas are most exposed is the connector 200. According to the present disclosure, the connector 200 may be improved to prevent a high-temperature environment caused by a flame in the battery module 10 and/or a high-pressure environment caused by venting gas in the battery module 10 from spreading to the outside.

With the connector housing 220 coupled to the connector header body 230, the connector housing 220 may be exposed through the opening 152 inside the module case 150, and then the module case 150 and the connector header body 230 may be fastened to each other with the bolt 240. Instead, the connector header body 230 may be in surface contact with the module case 150 inside the module case 150 and the bolt 240 may be fastened outside the module case 150, and then the connector housing 220 may be coupled to the connector header body 230 outside the module case 150.

The opening 152 may have a size enough to be covered by the fastening of the connector housing 220. The opening 152 may be larger than the connector housing 220 and thus, a part of the connector header body 230 may be visible from the outside of the module case 150.

The connector header body 230 is formed of a heterogeneous composite material. The heterogeneous composite material refers to a material including a heat-resistant metal material with a melting point of 1000° C. or higher and a lightweight metal material lighter than the heat-resistant metal material. The connector header body 230 may include a first portion 230*a* that is relatively farther from the connector housing 220 and is formed of the heat-resistant metal material, and a second portion 230*b* that is closer to the connector housing 220 than the first portion 230*a* and is formed of the lightweight metal material. The heterogeneous composite material of the connector header body 230 may be a clad metal. The clad metal refers to a composite metal obtained by joining two or more kinds of metals with different properties under high pressure and then performing diffusion annealing to induce bonding dissimilar metals. The clad metal may have a layer structure between dissimilar metals and may be used as a single material.

The heat-resistant metal material is a metal material that is difficult to melt because it has a melting point of 1000° C. or higher. For example, a metal referred to as a refractory metal or a refractory metal which is a generic term for a metal with a melting point higher than 1539° C. that is a melting point of iron may be the heat-resistant metal material. Examples of the heat-resistant metal material include niobium, vanadium, tantalum, titanium, zirconium, hafnium, molybdenum, and tungsten.

A heat-resistant alloy that is an alloy based on iron, nickel, or cobalt and is used up to about 1100° C. but may withstand 1300° C. or higher may be the heat-resistant metal material. The iron-based alloy may be improved by increasing chromium and nickel to stainless steel (SUS metal) or adding other elements. The nickel-based alloy is obtained by adding chromium and cobalt to nickel. There is also a nickel-molybdenum alloy called a Hastelloy.

When a flame occurs in the battery module 10, a temperature adjacent to the connector header body 230 may rise to about 600° C. or higher (at least 5 minutes), and thus, the connector header body 230 should be able to withstand high temperature/high pressure (100 kpa). Accordingly, the present disclosure proposes that the connector header body 230 includes the heat-resistant metal material with a melting point of 1000° C. or higher.

In particular, it is referable that the heat-resistant metal material faces the cell assembly 100 inside the module case 150 and a melting point of the heat-resistant metal material is 1400° C. or higher.

In the present embodiment of FIGS. 4 and 5, in the connector header body 230, the first portion 230*a* facing the cell assembly 100 inside the module case 150 is formed of the heat-resistant metal material. The second portion 230*b* facing the outside of the module case 150 compared to the first portion 230*a*, that is, a portion surface-contacting the inside of the module case 150 of the present embodiment, is formed of the lightweight metal material lighter than the first portion 230*a*.

Preferably, the first portion 230a is formed of a stainless steel (SUS metal) material, and the second portion 230b is formed of an aluminum-based metal material. The stainless steel (SUS metal) material has a melting point of 1400° C. or higher, and thus, does not easily melt even when a flame occurs in the battery module 10. The stainless steel (SUS metal) material is cheaper than other heat-resistant metal materials. The stainless steel (SUS metal) material has easy processability even when it is manufactured as a clad metal together with a lightweight metal material. Because aluminum has a melting point of 660° C., it is very light while having some resistance to high temperature-related issues generated outside the battery module. Aluminum has easy processability even when it is manufactured as a clad metal together with a stainless steel (SUS metal) material.

According to the present disclosure, the first portion 230a of the connector header body 230 may be maintained intact even in a relatively high-temperature environment. For example, even when a flame directly contacts the connector header body 230, the first portion 230a may not melt, and heat transfer to the connector housing 220 opposite to the module case 150 may be prevented.

The entire connector header body 230 is not formed of the heat-resistant metal material, but only the first portion 230a facing the cell assembly 100 inside the module case 150 is formed of the heat-resistant metal material and the remaining portion, that is, the second portion 230b facing the outside of the module case 150 is formed of the lightweight metal material lighter than the first portion 230a. Accordingly, heat resistance may be ensured by applying a stainless steel (SUS metal) material to a portion exposed to the inside of the battery 10 and exposed to high temperature/high pressure. A portion facing the outside of the battery module 10 is formed of the lightweight metal material such as an aluminum-based metal material, to reduce a weight.

In a conventional connector, because portions corresponding to the connector housing 220 and the connector header body 230 are formed of only a plastic injection product, the portions melt during thermal runaway, and thus, smoke and a flame are exposed to the outside. When the connector is manufactured by using a material having a higher melting point than that of a plastic injection product, for example, a single metal, the connector may be very heavy. When the heavy connector is fastened to the module case 150, a fastening means such as the bolt 240 may be loosened, thereby failing to maintain airtightness.

In the present embodiment, because a connector using a heterogeneous composite material having high heat resistance and light weight is provided, thermal runaway-related GB standards may be satisfied and airtightness and weight reduction may be achieved.

As such, according to the present disclosure, there is provided a battery module including a high heat-resistant connector in which, even when thermal runaway occurs, an airtight structure of the battery module is maintained and a high temperature/high-pressure environment is tolerated. Because a heterogeneous composite material is applied, a weight and costs may be reduced compared to a case of using a single metal.

In the present embodiment, the connector header body 230 and the connector housing 220 are separate components. In another embodiment, the connector housing 220 and the connector header body 230 may be a single integrally formed component. The connector header body 230 may be manufactured by manufacturing a clad metal disc including a heat-resistant metal material and a lightweight metal material and then processing the clad metal disc into the connector header body 230 having a desired shape. The connector housing 220 may be integrally manufactured with the connector header body 230 by placing the connector header body 230 and the connector terminal 210 in a mold, melting and injecting plastic into the mold, and then curing the same, which may be based on an insert injection method. When the connector housing 220 is integrally manufactured with the connector header body 230, there may be a strong binding force between the connector housing 220 and the connector header body 230 without using a separate fastening member. Accordingly, because the number of components is reduced, manufacturing costs may be reduced, and also, because a fastening process may be omitted, a manufacturing time may be reduced and a stable coupling structure may be formed.

Figure 6:
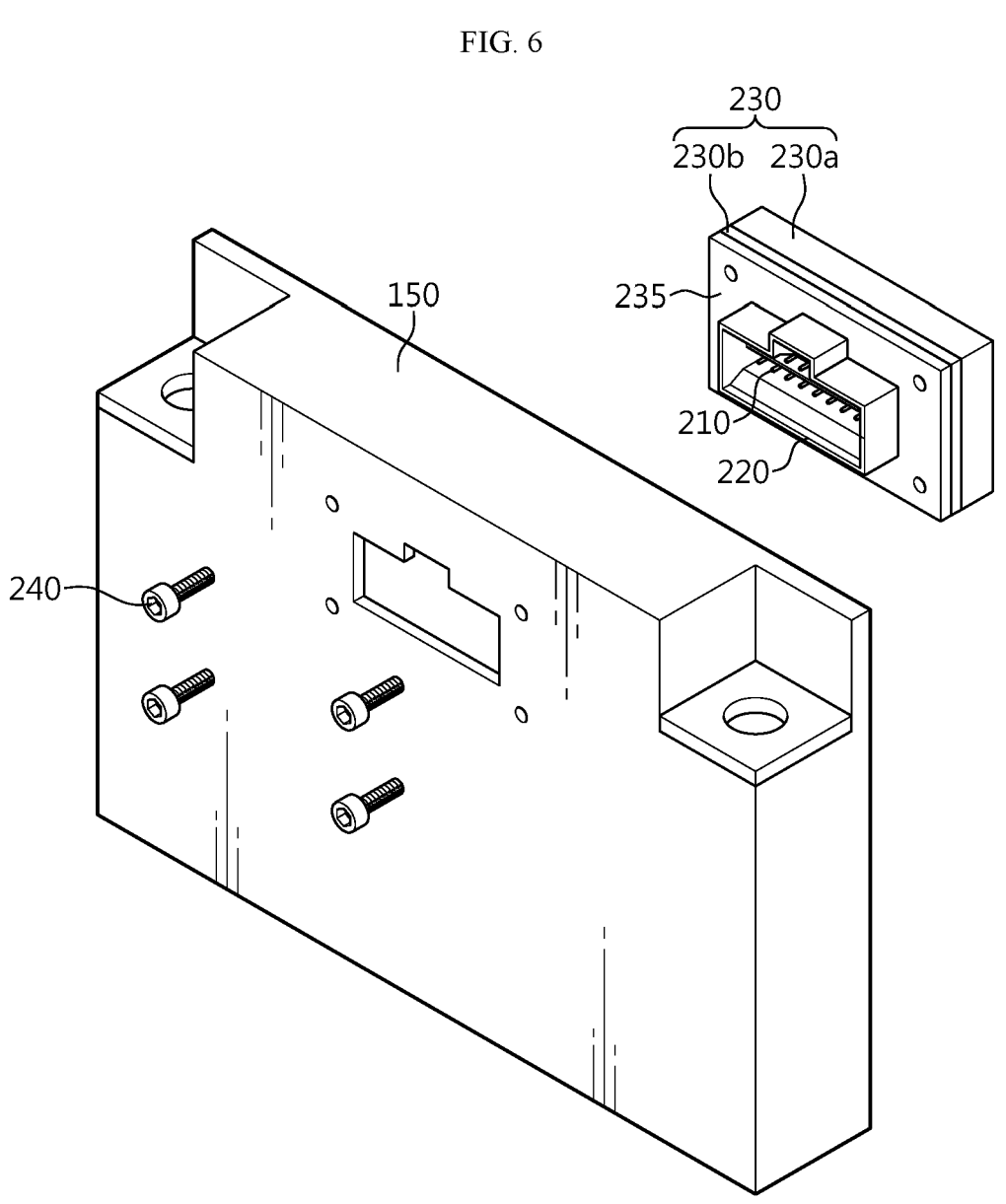
FIG. 6 is a perspective view illustrating a connector portion separated from a battery module, according to another embodiment of the present disclosure.
Figure 7:
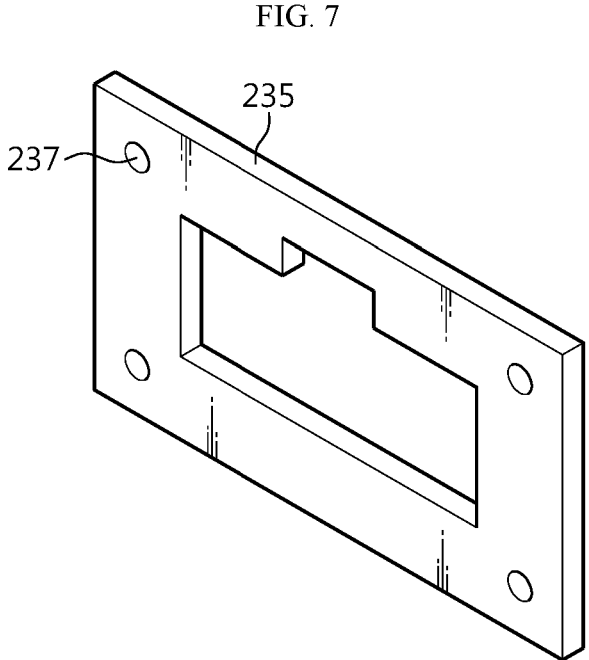
FIG. 7 is a perspective view illustrating a sealing gasket that may be included in a battery module, according to another embodiment of the present disclosure.

FIG. 6 is a perspective view illustrating a connector portion separated from a battery module, according to another embodiment of the present disclosure. FIG. 7 is a perspective view illustrating a sealing gasket that may be included in a battery module, according to another embodiment of the present disclosure.

Referring to FIGS. 6 and 7, the battery module 10 may further include a sealing gasket 235 located between the module case 150 and the connector header body 230 and having a melting pint of 1000° C. or higher.

The opening 152 may be formed in the module case 150, and the connector header body 230 may be in surface contact with the module case 150 via the sealing gasket 235 inside the opening 152 to keep the opening 152 airtight. A fastening hole through which the bolt 240 passes may be formed in the connector header body 230.

With the sealing gasket 235 and the connector housing 220 coupled to the connector header body 230, the connector housing 220 may be exposed through the opening 152 inside the module case 150, and then the module case 150 and the connector header body 230 may be fastened to each other with the bolt 240. Instead, the connector header body 230 may be in surface contact with the module case 150 via the sealing gasket 235 inside the module case 150 and the bolt 240 may be fastened outside the module case 150, and then the connector housing 220 may be coupled to the connector header body 230 outside the module case 150.

The sealing gasket 235 may have a frame shape with a hollow of the same size as that of the opening 152. An outer periphery of the sealing gasket 235 may coincide with an outer periphery of the connector header body 230.

The sealing gasket 235 and the connector header body 230 may be fastened together to the module case 150 with the bolt 240. Reference numeral 237 denotes a fastening hole formed in the sealing gasket 235 to allow the bolt 240 to pass therethrough.

Preferably, the sealing gasket 235 is a silicone gasket. The sealing gasket 235 maintains airtightness even when there is thermal runaway in the battery module 10, and is excellent in preventing a flame and gas from being exposed to the outside of the battery module 10 through the connector 200.

The opening 152 may have a size enough to be covered by the fastening of the connector housing 220. The opening 152 may be larger than the connector housing 220, and thus, a part of the connector header body 230 may be visible from the outside of the module case 150.

The sealing gasket 235 may be a component included in the connector 200, or may be a component separate from the connector 200. Even when a flame occurs in the battery module including the sealing gasket 235 and an abnormally high temperature state is caused, the battery module may maximize the effect of preventing flame diffusion to the outside of the battery module.

According to the present disclosure, the connector header body 230 may be maintained intact even in a relatively high-temperature environment. Even when a flame directly contacts the connector header body 230, the connector header body 230 does not melt. The sealing gasket 235 may also be maintained intact even in a relatively high-temperature environment. Even when a flame directly contacts the sealing gasket 235, the sealing gasket 235 does not melt. The sealing gasket 235 may prevent heat transfer to the connector housing 220 opposite to the module case 150.

In a conventional connector, portions corresponding to the connector housing 220 and the connector header body 230 are formed of only a plastic injection product, the portions melt during thermal runaway, and thus, smoke and a flame are exposed to the outside. The conventional connector does not include a sealing component such as the sealing gasket 235. In the present disclosure, because there is provided the battery module 10 including the sealing gasket 235 and the connector 200 including the connector header body 230 with a melting point of 1000° C. or higher and high heat resistance, thermal runaway-related GB standards may be satisfied and airtightness may be maintained.

As such, according to the present disclosure, there is provided a battery module in which, even when thermal runaway occurs, an airtight structure of the battery module is maintained and a high temperature/high-pressure environment is tolerated.

Figure 8:
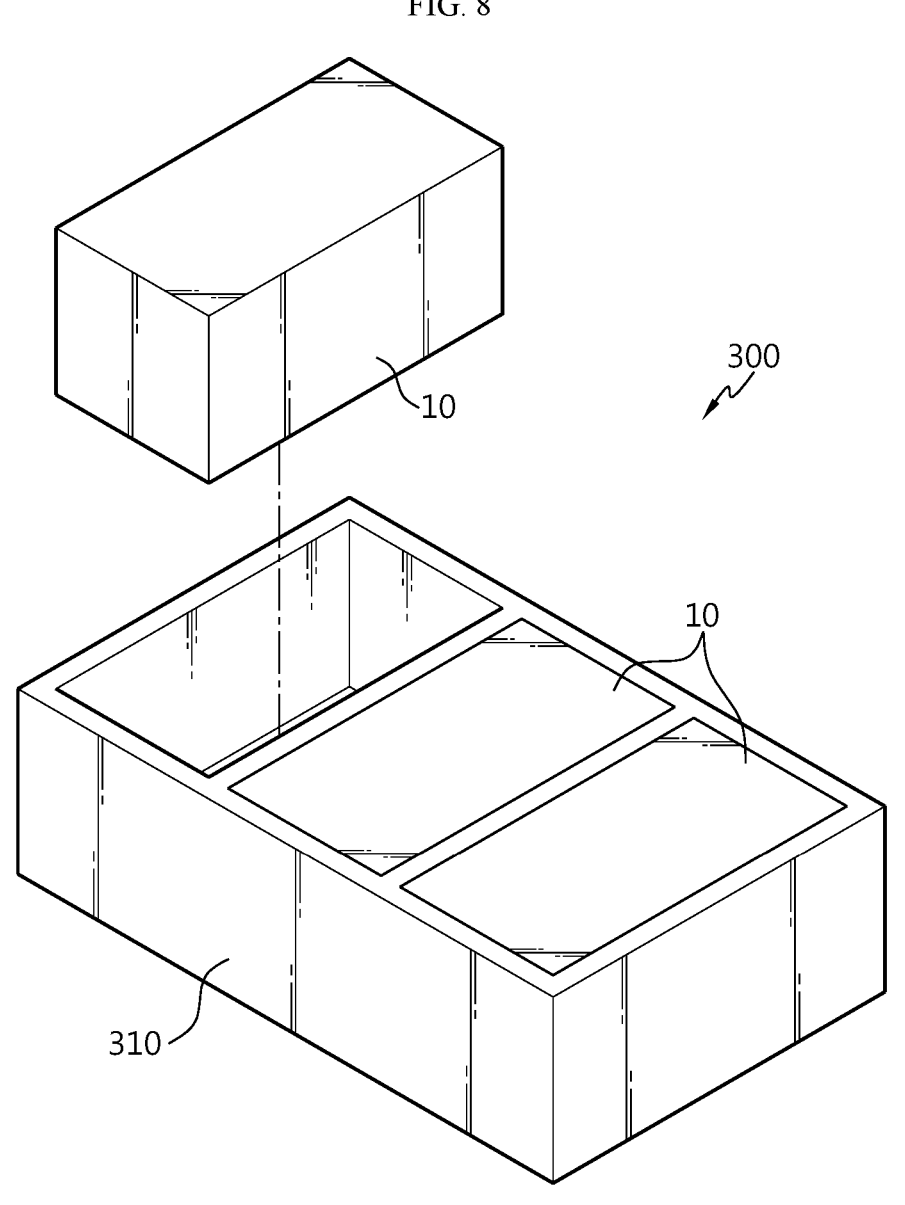
FIG. 8 is a schematic view illustrating a battery pack, according to an embodiment of the present disclosure.
Figure 9:
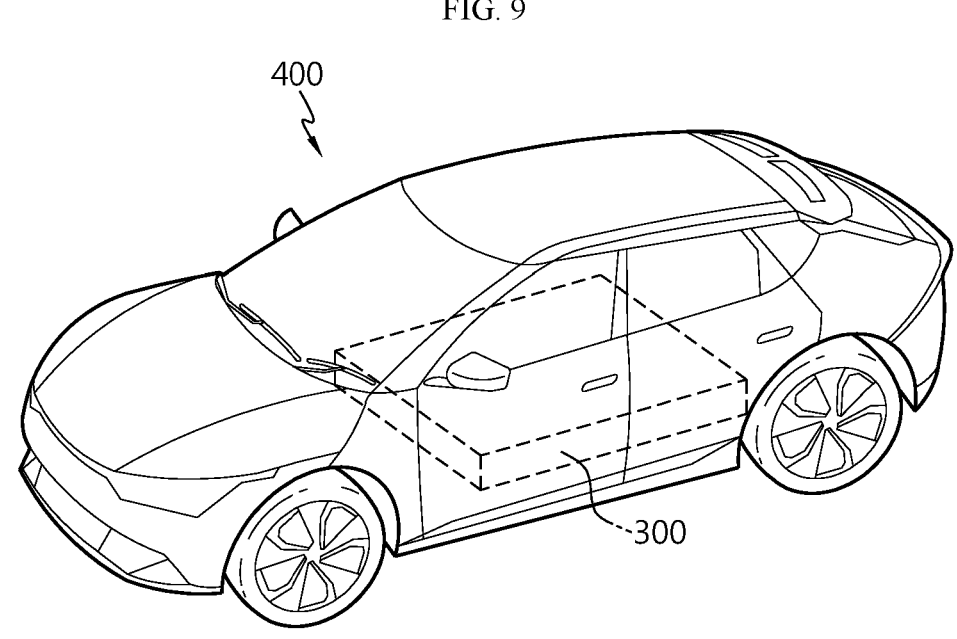
FIG. 9 is a schematic view illustrating a vehicle, according to an embodiment of the present disclosure.

FIG. 8 is a schematic view illustrating a battery pack, according to an embodiment of the present disclosure. FIG. 9 is a schematic view illustrating a vehicle, according to an embodiment of the present disclosure.

Referring to FIGS. 8 and 9, a battery pack 300 according to an embodiment of the present disclosure may include at least one battery module according to the present disclosure, for example, at least one battery module 10 according to an embodiment. Also, the battery pack 300 may include a pack case 310 in which the at least one battery module 10 may be accommodated. In addition, the battery pack 300 may further include various other elements such as a relay and a current sensor, which are known at the time of filling the application, in addition to the battery module 10.

The battery modules 10 each having a substantially rectangular parallelepiped shape may be arranged in the pack case 310, and each battery module 10 is connected to ensure power required to drive a vehicle 400.

The pack case 310 is a container in which the battery modules 10 are fixedly accommodated, and is a box having a rectangular parallelepiped shape. The pack case 310 may be provided at a certain position in the vehicle 400.

Preferably, the vehicle 400 may be an electrical vehicle. The battery pack 300 may be used as an electrical energy source for driving the vehicle 400 by providing a driving force to a motor of the electric vehicle. In this case, the battery pack 300 has a high nominal voltage of 100 V or more.

The battery pack 300 may be charged or discharged by an inverter according to driving of an internal combustion engine and/or the motor. The battery pack 300 may be charged by a regenerative charging device coupled to a brake. The battery pack 300 may be electrically connected to the motor of the vehicle 400 through the inverter. Also, the battery pack 300 may be provided in another device, mechanism, and equipment such as an energy storage system (ESS) using a secondary battery as well as the vehicle.

As such, because the battery pack 300 and the device, mechanism, and equipment including the battery pack 300 such as the vehicle 400 according to an embodiment of the present disclosure include the battery module 10 described above, the battery pack 300 and the device, mechanism, and equipment including the battery pack 300 such as the vehicle 400 may have the advantages of the battery module 10.

According to the above various embodiments, even when a flame occurs in a battery module and an abnormally high temperature state is caused, flame diffusion to the outside of the battery module may be prevented. Also, according to the present disclosure, even when venting gas is generated in the battery module and an abnormally high pressure state is caused, explosion of the battery module may be prevented.

For example, even when a temperature adjacent to a module case rises to about 600° C. or higher (at least 5 minutes), the battery module including a connector as proposed in the present disclosure may withstand high temperature/high pressure (100 kpa), and thus, heat transfer may be prevented. Accordingly, according to the present disclosure, the battery module having improved safety, and a battery pack and a vehicle including the battery module may be provided.

An embodiment of the present disclosure will be described in more detail by describing the following experiment.

Figure 10:
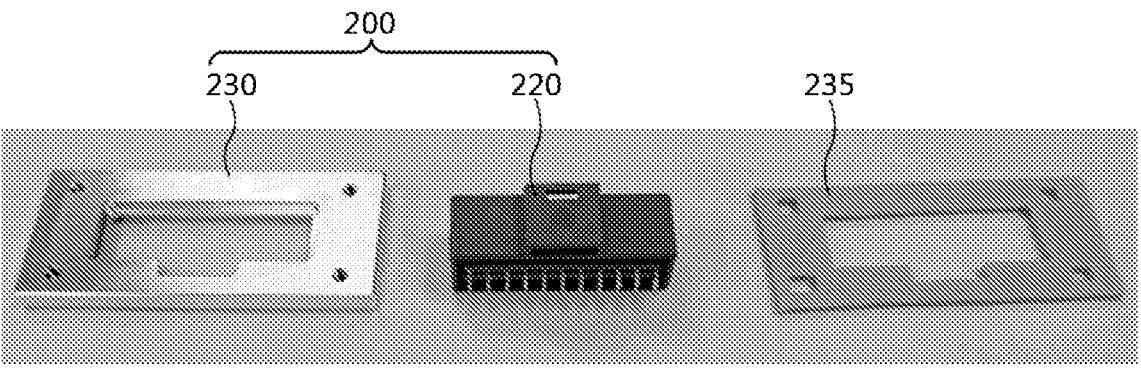
FIGS. 10 to 12 are photographs of a connector manufactured for an experiment.
Figure 11:
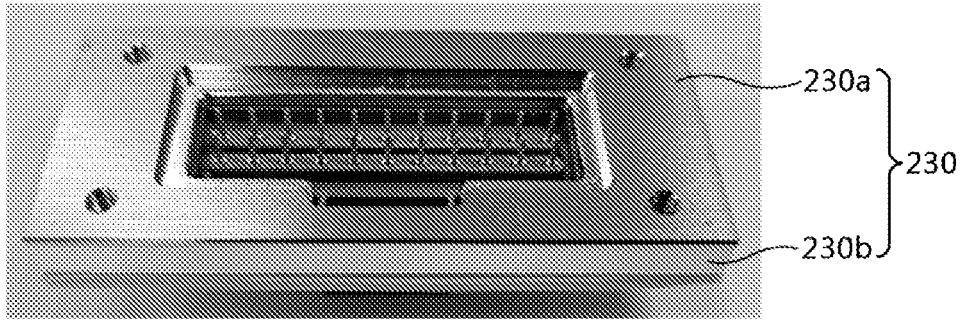
Figure 12:
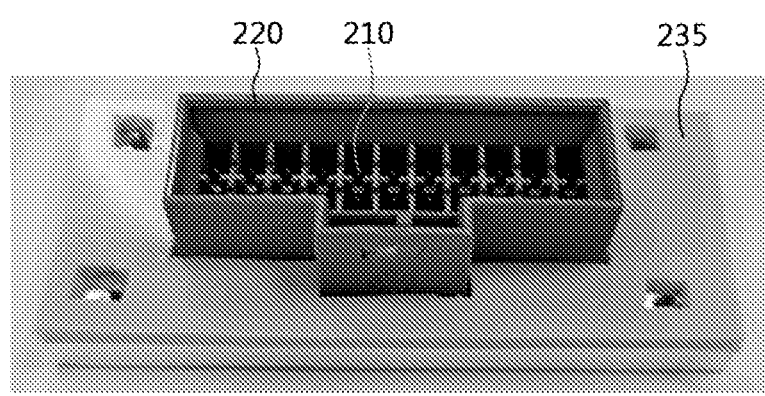

FIGS. 10 to 12 are photographs of a connector manufactured for an experiment. First, referring to FIG. 10, the connector header body 230 and the connector housing 220 including the connector terminal 210, which constitute the connector 200, and the sealing gasket 235 are illustrated.

FIG. 11 is a photograph taken from the connector header body 230 after the connector 200 and the sealing gasket 235 are assembled, particularly, illustrating the inside of a module case of a battery module. The first portion 230a of the connector header body 230 is formed of an SUS metal. The second portion 230b of the connector header body 230 is formed of aluminum. The first portion 230a and the second portion 230b are formed of a heterogeneous composite material that is a clad metal. A thickness of the clad metal was 6 mm, and a thickness of the SUS metal in the clad metal was 10% of the total thickness of the clad metal.

FIG. 12 is a photograph taken from the sealing gasket 235 after the connector 200 and the sealing gasket 235 are assembled, particularly illustrating the outside of the module case of the battery module. The sealing gasket 235 is formed of a silicone material. A thickness of the sealing gasket 235 was 2 mm.

Figure 13:
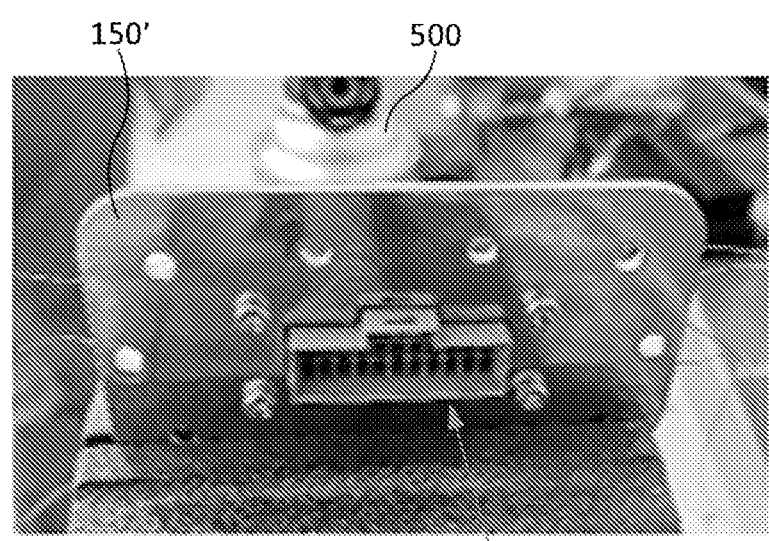
FIGS. 13 and 14 are test setting photographs for verifying a connector.
Figure 14:
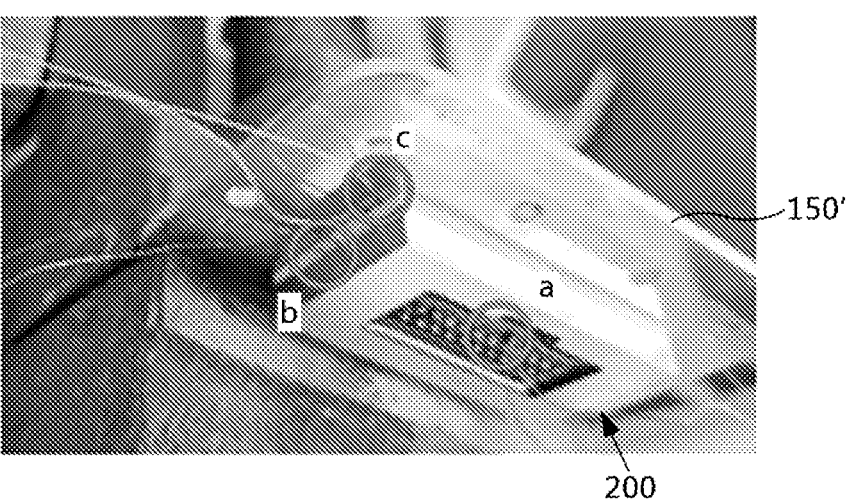

FIGS. 13 and 14 are test setting photographs for verifying the connector 200. In order to create a situation where the connector 200 is mounted on the module case, as shown in FIG. 13, the connector 200 was mounted via the sealing gasket 235 on a plate 150' formed of an aluminum material that is similar to the module case 150. In order to simulate a case where a flame occurs inside the module case, a test was performed by heating with a torch 500 from the opposite side of the plate 150'. In order to check a temperature of each portion during the test, as shown in FIG. 14, temperature measurement lines were respectively connected to a position 'a' close to the first portion 230a that is a portion directly exposed to the flame, a position 'b' corresponding to a space between the connector header body 230 and the sealing gasket 235, and a position 'c' corresponding to a space between the sealing gasket 235 and the plate 150'.

Figure 15:
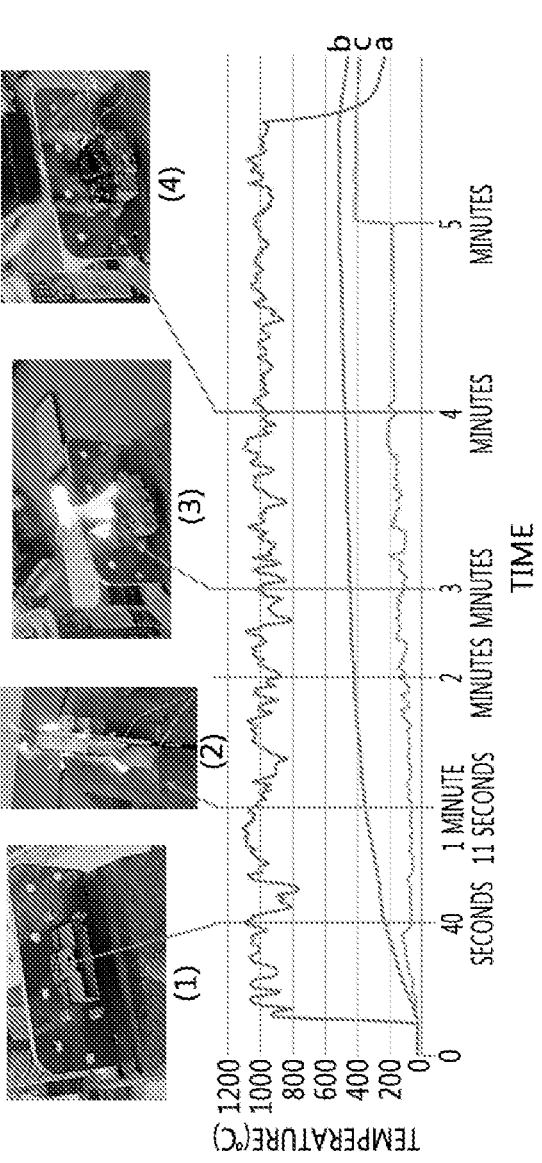
FIG. 15 is a graph illustrating a test result.

FIG. 15 is a graph illustrating a test result. FIG. 15 illustrates a photograph of the connector 200 taken at a specific point of time as an inserted picture.

A time when the flame started to occur with the torch 500 was set to 0 on the horizontal axis of the graph, and temperatures at the positions a, b and c were measured over time, mapped to the vertical axis, and represented as a graph. A temperature change at the position a corresponds to a temperature change at the first portion 230*a* that is a portion directly exposed to the flame, and as shown in FIG. 15, a temperature is very high at about 1000° C. However, because the first portion 230*a* blocks heat transfer, a temperature at the position b corresponding to a space between the connector header body 230 and the sealing gasket 235 drops to about 400° C. Furthermore, as the sealing gasket 235 blocks heat transfer, a temperature at the position c corresponding to a space between the gasket 235 and the plate 150' is maintained at 200° C. or lower, and rises to about 400° C. after 5 minutes. As such, because the connector 200 and the sealing gasket 235 are included, even when a flame occurs in the module case, heat transfer to the outside of the module case may be prevented.

In particular, looking at inserted pictures over time, the heat resistance effect is remarkable.

Referring to an inserted picture 1 of FIG. 15, it was observed that the connector housing 220 began to be deformed 40 seconds after heating with the torch 500. An inserted picture 2 is a photograph after 1 minute 11 seconds, and the connector housing 220 began to burn. Next, as shown in an inserted picture 3, the connector housing 220 was separated after 30 minute. An inserted picture 4 is a photograph after 4 minutes, and the connector housing 220 was completely burned but there was no flame exposure to the outside of the plate 150'.

As such, as proposed in the present disclosure, when the connector 200 is formed of a heterogeneous composite material, the connector housing 220 is separated after 3 minutes, but in a conventional connector of the related art, a connector housing is separated immediately after flame exposure. This is because the conventional connector is formed of only a plastic material, not a heterogeneous composite material. When the connector 200 is formed of a heterogeneous composite material, a flame is not exposed to the outside. Otherwise, a connector housing is immediately separated, and thus, a flame is exposed to the outside in less than 10 minutes. The connector 200 according to the present disclosure may withstand a flame at 1000° C. for 5 minutes, and has a remarkable effect of preventing flame exposure to the outside of the module case.

Also, when a flame occurs in a battery module, a high-pressure environment of about 100 kpa is caused. Although the above experiment was performed in a situation where the connector 200 was mounted on the plate 150' and was not sealed, because heat resistance was maintained even when a flame of 1000° C. was applied to the connector 200, it may be sufficiently expected that the connector 200 of the present disclosure may withstand high pressure caused by a flame.

While one or more embodiments of the present disclosure have been described with reference to the embodiments and figures, the present disclosure is not limited thereto, and it will be understood by one of ordinary skill in the art that various changes in form and details may be made therein without departing from the scope of the present disclosure as defined by the following claims.

DESCRIPTION OF REFERENCE NUMERALS

10: battery module
100: cell assembly
150: module case
200: connector
210: connector terminal
220: connector housing
230: connector header body
235: sealing gasket

What is claimed is:

1. A connector comprising:
a connector terminal;
a connector housing surrounding the connector terminal; and
a connector header body coupled to the connector housing and formed of a heterogeneous laminate material comprising a first portion formed of a heat-resistant metal material with a melting point of 1000° C. or higher and a second portion formed of a lightweight metal material lighter than the heat-resistant metal material,
wherein the first portion includes a step configured to receive the connector housing.

2. The connector according to claim 1, wherein the first portion has a thickness greater than a thickness of the second portion.

3. The connector according to claim 1, wherein the first portion is formed of stainless steel (SUS metal) and the second portion is formed of an aluminum-based metal material.

4. The connector according to claim 1, wherein the heterogeneous laminate material is a clad metal.

5. A battery module comprising:
a cell assembly comprising at least one battery cell;
a module case in which the cell assembly is accommodated; and
a connector mounted on the module case,
wherein the connector comprises:
a connector terminal for electrical connection to the battery cell;
a connector housing surrounding the connector terminal; and
a connector header body coupled to the connector housing and mounted on the module case in such a manner that at least a part of the connector header body is inserted into the module case, the connector header body being formed of a heterogeneous laminate material comprising a heat-resistant metal material with a melting point of 1000° C. or higher and a lightweight metal material lighter than the heat-resistant metal material.

6. The battery module according to claim 5, wherein the connector header body comprises a first portion that faces the cell assembly inside the module case and is formed of the heat-resistant metal material and a second portion that faces an outside of the module case compared to the first portion and is formed of the lightweight metal material.

7. The battery module according to claim 5, wherein the connector header body comprises a first portion that faces the cell assembly inside the module case and is formed of stainless steel (SUS metal) and a second portion that faces an outside of the module case compared to the first portion and is formed of an aluminum-based metal material.

8. The battery module according to claim 5, wherein, in the connector header body, the heat-resistant metal material faces the cell assembly inside the module case, and
wherein a melting point of the heat-resistant metal material is 1400° C. or higher.

9. The battery module according to claim 5, wherein the heterogeneous laminate material is a clad metal.

10. The battery module according to claim 5, wherein an opening is formed in the module case, and the connector header body is in surface contact with the module case inside the opening and a bolt is fastened in the connector header body to keep the opening airtight.

11. The battery module according to claim 10, wherein the connector header body comprises a first portion that faces the cell assembly inside the module case and is formed of the heat-resistant metal material and a second portion that faces an outside of the module case compared to the first portion and is formed of the lightweight metal material.

12. The battery module according to claim 5, wherein the connector housing is coupled to the connector header body by press-fitting or hook fastening.

13. The battery module according to claim 5, wherein the connector housing and the connector header body are a single, integrally formed product.

14. The battery module according to claim 5, further comprising a sealing gasket located between the module case and the connector header body, the sealing gasket having a melting point of 1000° C. or higher.

15. The battery module according to claim 14, wherein an opening is formed in the module case, and wherein the connector header body is in contact with the module case via the sealing gasket inside the opening to keep the opening airtight.

16. The battery module according to claim 15, wherein the sealing gasket has a frame shape with a central opening having a same size as a size of the opening.

17. The battery module according to claim 14, wherein the sealing gasket and the connector header body are fastened to the module case with a bolt.

18. The battery module according to claim 14, wherein the sealing gasket is a silicone gasket.

19. A battery pack comprising:

at least one battery module according to claim 5; and a pack case for packaging the at least one battery module.

20. A vehicle comprising at least one battery module according to claim 19.

\* \* \* \* \*